United States Patent
Schroeder et al.

(10) Patent No.: US 10,469,262 B1
(45) Date of Patent: Nov. 5, 2019

(54) METHODS AND SYSTEMS FOR NETWORK SECURITY USING A CRYPTOGRAPHIC FIREWALL

(71) Applicant: Verizon Patent and Licensing Inc., Basking Ridge, NJ (US)

(72) Inventors: Ted Schroeder, Saratoga, CA (US); Gabor Lengyel, Half Moon Bay, CA (US)

(73) Assignee: Verizon Patent ad Licensing Inc., Basking Ridge, NJ (US)

( * ) Notice: Subject to any disclaimer, the term of this patent is extended or adjusted under 35 U.S.C. 154(b) by 492 days.

(21) Appl. No.: 15/266,980

(22) Filed: Sep. 15, 2016

Related U.S. Application Data

(60) Provisional application No. 62/287,790, filed on Jan. 27, 2016.

(51) Int. Cl.
| | | |
|---|---|---|
| *H04L 9/32* | (2006.01) | |
| *H04L 9/08* | (2006.01) | |
| *H04L 9/06* | (2006.01) | |
| *H04L 29/06* | (2006.01) | |

(Continued)

(52) U.S. Cl.
CPC .......... *H04L 9/3228* (2013.01); *H04L 9/0643* (2013.01); *H04L 9/0863* (2013.01);
(Continued)

(58) Field of Classification Search
CPC ... H04L 9/3228; H04L 9/0643; H04L 9/0863; H04L 9/3239; H04L 9/3242; H04L 63/0428; H04L 63/166
See application file for complete search history.

(56) References Cited

U.S. PATENT DOCUMENTS

| | | |
|---|---|---|
| 6,226,750 B1 | 5/2001 | Trieger |
| 6,366,577 B1 | 4/2002 | Donovan |
| | (Continued) | |

FOREIGN PATENT DOCUMENTS

| | | |
|---|---|---|
| CN | 1514569 B | 7/2004 |
| GB | 2367725 A | 4/2002 |
| | (Continued) | |

OTHER PUBLICATIONS

Olson et al., "Trust Negotiation as an Authorization Service for Web Services," ICDEW, 2006, 2013 IEEE 29th International Conference on Data Engineering Workshops (ICDEW), 2013 IEEE 29th International Conference on Data Engineering Workshops (ICDEW) 2006, pp. 21, doi:10.
(Continued)

*Primary Examiner* — Oleg Korsak
*Assistant Examiner* — Devin E Almeida

(57) ABSTRACT

A method is performed at a security device. The method includes establishing a network connection with a client system. After establishing the network connection, the security device receives a first packet from the client system. The first packet includes an identifier, a first counter value, and a first one-time password hash generated by the client system. Based on the identifier received, the security device retrieves from a trusted data store the seed and a second counter value. If the first counter value is larger than the second counter value, the security device generates a second one-time password hash based on the identifier, the first counter value, and the seed. In accordance with a determination that the first and second one-time password hashes match, the security device grants, to the client system, access to one or more network resources protected by the security device via the network connection.

20 Claims, 5 Drawing Sheets

(52) U.S. Cl.
CPC .......... *H04L 9/3239* (2013.01); *H04L 9/3242* (2013.01); *H04L 63/0428* (2013.01); *H04L 63/166* (2013.01)

(56) References Cited

U.S. PATENT DOCUMENTS

| | | |
|---|---|---|
| 6,687,822 B1 | 2/2004 | Jakobsson |
| 7,131,000 B2 | 10/2006 | Bradee |
| 7,155,738 B2 | 12/2006 | Zhu et al. |
| 7,428,750 B1 | 9/2008 | Dunn et al. |
| 7,536,544 B2 | 5/2009 | Xiao |
| 7,562,382 B2 | 7/2009 | Hinton et al. |
| 7,596,530 B1 | 9/2009 | Glasberg |
| 7,644,446 B2 | 1/2010 | Strom et al. |
| 7,657,639 B2 | 2/2010 | Hinton |
| 7,673,046 B2 | 3/2010 | Lehew et al. |
| 7,814,531 B2 | 10/2010 | Khosravi et al. |
| 7,831,047 B2 | 11/2010 | Rowe |
| 7,900,046 B2 | 3/2011 | Baliga et al. |
| 7,996,631 B1 | 8/2011 | Bender et al. |
| 8,141,139 B2 | 3/2012 | Hinton et al. |
| 8,196,177 B2 | 6/2012 | Hinton |
| 8,214,394 B2 | 7/2012 | Krishnaprasad et al. |
| 8,214,634 B1 | 7/2012 | Steele et al. |
| 8,255,984 B1 | 8/2012 | Ghostine et al. |
| 8,359,360 B2 | 1/2013 | Logue et al. |
| 8,375,430 B2 | 2/2013 | Grewal et al. |
| 8,382,593 B2 | 2/2013 | Edgren et al. |
| 8,396,949 B2 | 3/2013 | Bubolz et al. |
| 8,443,435 B1 | 5/2013 | Schroeder |
| 8,447,976 B2 | 5/2013 | Jain et al. |
| 8,522,019 B2 | 8/2013 | Michaelis |
| 8,590,029 B2 | 11/2013 | Vitaletti |
| 8,667,593 B1 | 3/2014 | Shnitzer |
| 8,707,451 B2 | 4/2014 | Ture et al. |
| 8,732,452 B2 | 5/2014 | Byrum et al. |
| 8,782,759 B2 | 7/2014 | Hinton et al. |
| 8,793,769 B2 | 7/2014 | Marcia et al. |
| 8,843,997 B1 | 9/2014 | Hare |
| 8,856,957 B1 | 10/2014 | Roth et al. |
| 8,875,249 B2 | 10/2014 | Ture et al. |
| 8,903,315 B2 | 12/2014 | Pering et al. |
| 9,069,869 B1* | 6/2015 | Quinn ................. G06F 16/9566 |
| 9,398,050 B2 | 7/2016 | Islam et al. |
| 9,705,678 B1* | 7/2017 | Wang ................... G06F 21/575 |
| 2002/0095571 A1 | 7/2002 | Bradee |
| 2002/0156965 A1 | 10/2002 | Gusler et al. |
| 2002/0184507 A1 | 12/2002 | Makower et al. |
| 2003/0023689 A1 | 1/2003 | Brown et al. |
| 2003/0130960 A1 | 7/2003 | Fraser et al. |
| 2003/0140131 A1 | 7/2003 | Chandrashekhar et al. |
| 2003/0167308 A1 | 9/2003 | Schran |
| 2003/0220880 A1 | 11/2003 | Lao et al. |
| 2004/0098620 A1 | 5/2004 | Shay |
| 2004/0128392 A1 | 7/2004 | Blakley, III et al. |
| 2004/0187031 A1 | 9/2004 | Liddle |
| 2004/0220878 A1 | 11/2004 | Lao et al. |
| 2004/0259633 A1 | 12/2004 | Gentles et al. |
| 2005/0015586 A1 | 1/2005 | Brickell |
| 2005/0097321 A1 | 5/2005 | Zhu et al. |
| 2005/0213584 A1 | 9/2005 | Donovan |
| 2005/0223217 A1 | 10/2005 | Howard et al. |
| 2005/0223413 A1 | 10/2005 | Duggan et al. |
| 2005/0238034 A1 | 10/2005 | Gillespie et al. |
| 2006/0020679 A1 | 1/2006 | Hinton et al. |
| 2006/0059544 A1 | 3/2006 | Guthrie et al. |
| 2006/0090074 A1 | 4/2006 | Matoba |
| 2006/0156026 A1 | 7/2006 | Utin |
| 2006/0212931 A1 | 9/2006 | Shull et al. |
| 2006/0236382 A1 | 10/2006 | Hinton et al. |
| 2007/0006282 A1 | 1/2007 | Durham et al. |
| 2007/0101400 A1 | 5/2007 | Freeman et al. |
| 2007/0143629 A1 | 6/2007 | Hardjono et al. |
| 2007/0208745 A1 | 9/2007 | Ture et al. |
| 2007/0208755 A1 | 9/2007 | Bhatkar et al. |
| 2007/0226784 A1* | 9/2007 | Ueda ....................... G06F 21/36 726/5 |
| 2008/0005359 A1 | 1/2008 | Khosravi et al. |
| 2008/0010665 A1 | 1/2008 | Hinton et al. |
| 2008/0034420 A1 | 2/2008 | Chang |
| 2008/0046984 A1 | 2/2008 | Bohmer et al. |
| 2008/0109904 A1 | 5/2008 | In et al. |
| 2008/0112551 A1 | 5/2008 | Forbes et al. |
| 2008/0222174 A1 | 9/2008 | Lyman |
| 2008/0229427 A1 | 9/2008 | Ramirez |
| 2008/0320567 A1 | 12/2008 | Shulman et al. |
| 2009/0070863 A1 | 3/2009 | Shimizu et al. |
| 2009/0083403 A1 | 3/2009 | Xu et al. |
| 2009/0150297 A1 | 6/2009 | Richard |
| 2009/0182592 A1 | 7/2009 | Ballaro et al. |
| 2009/0217033 A1 | 8/2009 | Costa et al. |
| 2009/0259753 A1 | 10/2009 | Hinton et al. |
| 2009/0319781 A1 | 12/2009 | Byrum et al. |
| 2009/0328186 A1 | 12/2009 | Pollutro et al. |
| 2010/0054480 A1 | 3/2010 | Schneider |
| 2010/0058072 A1* | 3/2010 | Teow .................. G06F 21/6218 713/193 |
| 2010/0122333 A1 | 5/2010 | Noe |
| 2010/0174810 A1 | 7/2010 | Cain et al. |
| 2010/0189260 A1 | 7/2010 | Ramanathan et al. |
| 2010/0242083 A1 | 9/2010 | Begum et al. |
| 2010/0242099 A1 | 9/2010 | Tsao |
| 2010/0313016 A1 | 12/2010 | Zhang et al. |
| 2010/0313276 A1 | 12/2010 | Banti et al. |
| 2010/0325710 A1 | 12/2010 | Etchegoyen |
| 2011/0013637 A1 | 1/2011 | Xu et al. |
| 2011/0047381 A1 | 2/2011 | Ganesan et al. |
| 2011/0061103 A1 | 3/2011 | Salkewicz |
| 2011/0078775 A1 | 3/2011 | Yan |
| 2011/0145565 A1 | 6/2011 | Kol et al. |
| 2011/0320617 A1* | 12/2011 | Annamalaisami ........................... H04L 63/1458 709/228 |
| 2012/0022928 A1 | 1/2012 | Wu |
| 2012/0084570 A1 | 4/2012 | Kuzin et al. |
| 2012/0144464 A1 | 6/2012 | Fakhrai et al. |
| 2012/0164982 A1 | 6/2012 | Klein |
| 2012/0254957 A1 | 10/2012 | Fork et al. |
| 2012/0331532 A1 | 12/2012 | Walters et al. |
| 2013/0107889 A1 | 5/2013 | Barabash et al. |
| 2013/0185799 A1 | 7/2013 | Pfeifer et al. |
| 2013/0191494 A1 | 7/2013 | Sidhu et al. |
| 2013/0219164 A1 | 8/2013 | Hamid |
| 2013/0275376 A1 | 10/2013 | Huddlow et al. |
| 2013/0276086 A1 | 10/2013 | Yu |
| 2013/0318577 A1 | 11/2013 | Bulusu et al. |
| 2013/0326228 A1 | 12/2013 | Utin |
| 2014/0006598 A1 | 1/2014 | Uola |
| 2014/0007229 A1 | 1/2014 | Smith et al. |
| 2014/0013396 A1 | 1/2014 | Field-Eliot et al. |
| 2014/0075184 A1 | 3/2014 | Gorbach et al. |
| 2014/0090033 A1 | 3/2014 | Lerner et al. |
| 2014/0096199 A1 | 4/2014 | Dave et al. |
| 2014/0122873 A1 | 5/2014 | Deutsch et al. |
| 2014/0133656 A1* | 5/2014 | Wurster ................ H04L 9/0637 380/270 |
| 2014/0157370 A1 | 6/2014 | Plattner et al. |
| 2014/0222955 A1 | 8/2014 | Islam et al. |
| 2014/0223178 A1 | 8/2014 | Islam et al. |
| 2015/0237035 A1 | 8/2015 | Islam et al. |

FOREIGN PATENT DOCUMENTS

| | | |
|---|---|---|
| WO | WO2008021454 A2 | 2/2008 |
| WO | WO2009/136795 | 11/2009 |
| WO | WO2012091810 A1 | 7/2012 |

OTHER PUBLICATIONS

Reimer et al., "Federal Identity Access Broker Pattern for Cloud Computing," Network-Based Information System (NBIS), 2013 16th International Conference on IEEE, 2013.

(56) References Cited

OTHER PUBLICATIONS

Vidder, Invitation to pay additional fees and Partial Search Report, PCT/US2014/013235, 5 Pgs.
Vidder Inc., International Search Report and Written Opinion, PCT/US2014/013235, 15 Pgs.
Vidder Inc., International Preliminary Report on Patentability, PCT/US2014/013235, dated Aug. 4, 2015, 10 Pgs.

* cited by examiner

METHODS AND SYSTEMS FOR NETWORK SECURITY USING A CRYPTOGRAPHIC FIREWALL

RELATED APPLICATIONS

This application claims priority to U.S. Provisional Patent Application No. 62/287,790 filed Jan. 27, 2016, which is hereby incorporated by reference in its entirety.

TECHNICAL FIELD

The disclosed implementations generally relate to the field of computer networks, and relate in particular to using cryptographic techniques to secure access to protected network resources.

BACKGROUND

Computer communication networks have become the de facto method of communication for the modern world. In addition to communication between private citizens, various organizations use computer communication networks to communicate, share information, and share documents. Much of this communication is transmitted over non-private computer networks (such as the Internet).

Organizations, such as corporations and governments, often need to communicate sensitive information over the Internet. As such, being able to securely transmit the information over the Internet is very important. Some organizations use encryption techniques to attempt to secure information crossing the Internet unreadable to non-authorized parties. Some organizations use virtual private networks (VPNs) to secure their computers and system. However, making resources available over a public network also makes organizations more vulnerable to malicious attack and unauthorized access.

SUMMARY

Accordingly, there is a need for methods, devices, systems, and interfaces for securing access to protected network resources. By using a security device to employ cryptographic techniques, such as hash generation, based on data received from a client system requesting access to network resources, and based on data retrieved from a trusted device, the security device can effectively and securely grant access only to authorized users and systems, or similarly terminate network connections to unauthorized users and systems.

In accordance with some implementations, a method is performed at a security device (e.g., a cryptographic firewall) having one or more processors and memory storing one or more programs for execution by the one or more processors. The method includes establishing a network connection with a client system (i.e., the client system establishes a network connection with the security device). After establishing the network connection, the security device receives from the client system a first packet. The first packet includes an identifier, a first counter value, wherein the first counter value is one of a plurality of incremental counts generated by a system counter, and a first one-time password hash generated by the client system based on the identifier, the first counter value, and a seed. Based on the identifier received from the client system, the security device retrieves from a trusted data store the seed and a second counter value. If the first counter value is larger than the second counter value, the security device generates a second one-time password hash based on the identifier, the first counter value, and the seed. The security device then determines whether the first one-time password hash and the second one-time password hash match. In accordance with a determination that the first one-time password hash and the second one-time password hash match, the security device grants, to the client system, access to one or more network resources protected by the security device via the network connection.

In accordance with some implementations, a security device includes one or more processors, memory, and one or more programs; the one or more programs are stored in the memory and configured to be executed by the one or more processors. The one or more programs include instructions for performing the operations of the method described above. In accordance with some implementations, a computer-readable storage medium has stored therein instructions that, when executed by a security device, cause the security device to perform the operations of the method described above.

Devices and systems are therefore provided with faster, more efficient methods and interfaces for securing access to protected network resources. Such methods, devices, systems, and interfaces optionally complement or replace conventional methods for securing access to protected network resources.

BRIEF DESCRIPTION OF THE DRAWINGS

For a better understanding of the various described implementations, reference should be made to the Description of Implementations below, in conjunction with the following drawings. Like reference numerals refer to corresponding parts throughout the figures and description.

DESCRIPTION OF IMPLEMENTATIONS

Figure 1:
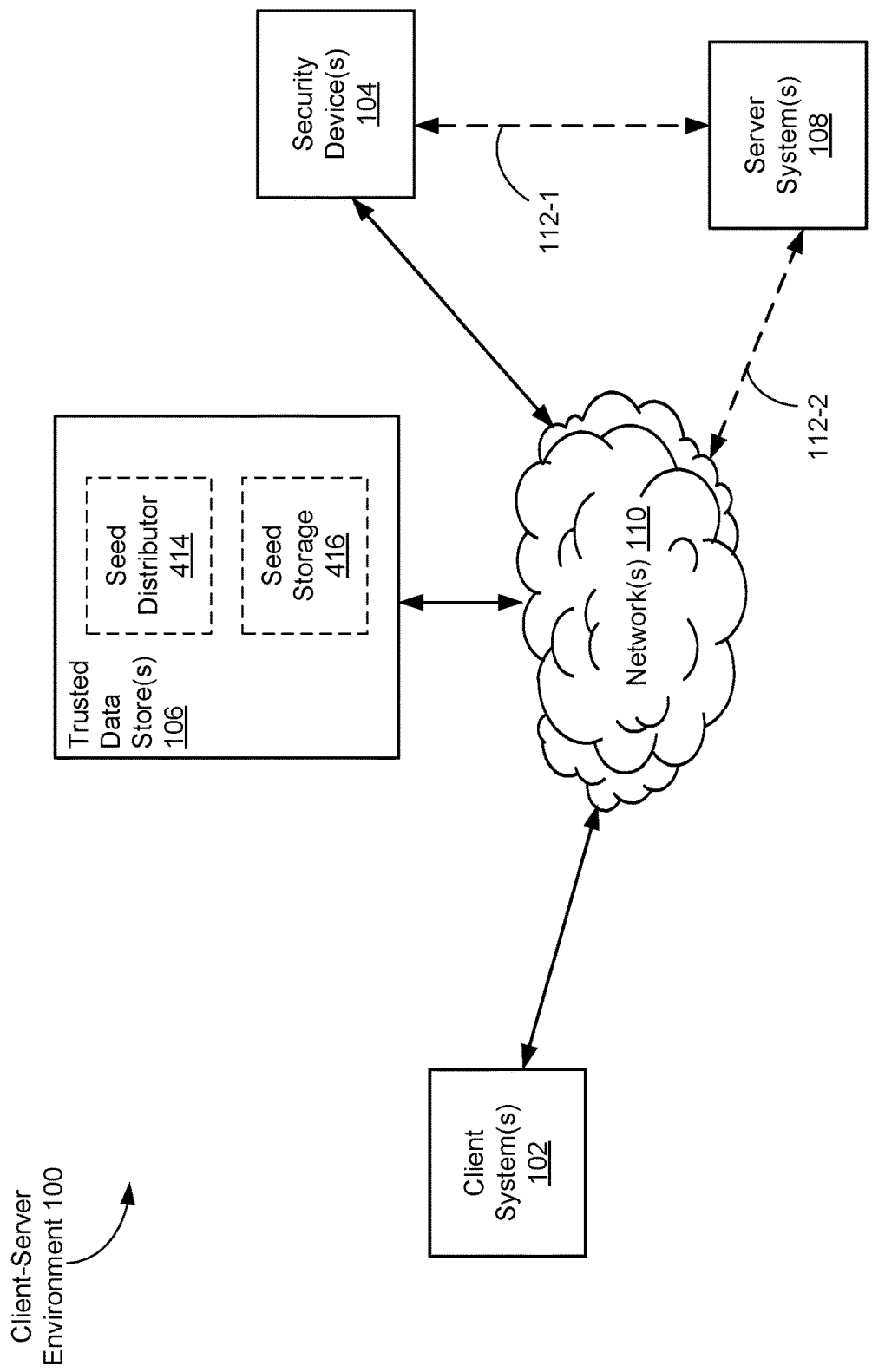
FIG. 1 is a block diagram illustrating an exemplary client-server environment, in accordance with some implementations.

Reference will now be made to implementations, examples of which are illustrated in the accompanying drawings. In the following description, numerous specific details are set forth in order to provide an understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are used only to distinguish one element from another. For example, a first counter value could be termed a second counter value, and, similarly, a second counter value could be termed a first counter value, without departing from the scope of the various described implementations. The first counter value and the second counter value are both counter values, but they are not the same counter value.

The terminology used in the description of the various implementations described herein is for the purpose of describing particular implementations only and is not intended to be limiting. As used in the description of the various described implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

Systems and methods are described herein for improving the security of network assets and network communications performed over the Internet or any other public computer network. In some implementations, the network in question is a corporate network for a large organization with diverse operations—sometimes in multiple countries—and a host of employees who perform a variety of different roles in the organization and who need to access the organization's network—sometimes using a variety of client systems. Securing corporate networks is particularly important because organizations with sensitive information are at risk from malicious attacks that target networked assets (e.g. servers accessible over public computer networks, such as the Internet, or data stored in a network) or target actual communications that are transmitted over the publically accessible network.

FIG. 1 is a block diagram illustrating an exemplary client-server environment 100, in accordance with some implementations. The client-server environment 100 includes a client system 102 (also called "client devices," "client computers," or "clients"), a trusted data store 106, a security device 104 (also called a "firewall" in some implementations), and a server system 108, communicably connected by one or more networks 110 (e.g., the Internet, cellular telephone networks, mobile data networks, other wide area networks, local area networks, metropolitan area networks, and so on).

In some implementations, the one or more networks 110 include a public communication network (e.g., the Internet and/or a cellular data network), a private communications network (e.g., a private LAN or leased lines), or a combination of such communication networks. In some implementations, the one or more networks 110 use the HyperText Transport Protocol (HTTP) and the Transmission Control Protocol/Internet Protocol (TCP/IP) to transmit information between devices or systems. HTTP permits client systems to access various resources available via the one or more networks 110. In some implementations, the one or more networks 110 are wireless communications channels based on various custom or standard wireless communications protocols (e.g., IEEE 802.15.4, IEEE 802.11 Wi-Fi, ZigBee, 6LoWPAN, Thread, Z-Wave, Bluetooth Smart, ISA100.11a, WirelessHART, MiWi, etc.), or any other suitable communication protocol, including communication protocols not yet developed as of the filing date of this document. Alternatively, in some implementations, at least a portion of the one or more networks 110 comprise physical interfaces based on wired communications protocols (e.g., Ethernet, USB, etc.). Although all devices and systems are illustrated as being interconnected through the network 110, in some implementations, any of the aforementioned devices or systems are communicably connected with each other either directly (i.e., device-to-device) or through a network device (e.g., a router represented by network 110), or with only a subset of the other devices and systems of the client-server environment 100, via any combination of the aforementioned networks 110 (e.g., the client system 102 and the security device 104 are each communicably connected to the trusted data store 106, but only the security device 104 is communicably connected to the server system 108, and thus access to network resources provided by the server system 108 is controlled by the security device 104). The various implementations of the invention, however, are not limited to the use of any particular communication protocol.

In some implementations, the client-server environment 100 includes one or more client systems 102. In some implementations, client systems 102 are computing devices such as smart watches, personal digital assistants, portable media players, smart phones, tablet computers, 2D gaming devices, 3D (e.g., virtual reality) gaming devices, laptop computers, desktop computers, televisions with one or more processors embedded therein or coupled thereto, in-vehicle information systems (e.g., an in-car computer system that provides navigation, entertainment, and/or other information), and/or other appropriate computing devices that can be used to communicate with one or more devices or systems of the client-server environment 100.

Users employ client systems 102 to access the resources and services provided by the server system 108. For example, in some implementations, the client system 102 executes a web browser application that can be used to access the server system 108. As another example, in some implementations, the client system 102 executes one or more software application that are specific to the server system 108 (e.g., "apps" running on smart phones or tablets for accessing services and resources provided by the server system 108). In some implementations, the server system 108 stores data (e.g., the work product of attorneys) and provide services (e.g., an email service or a document backup service) that is accessible over the network 110. In some implementation, access to system resources or services is controlled by dividing various resources into a plurality of virtual domains. Virtual domains are logical, not physical, groupings of related network data and resources to which some users have access to and others do not. In some implementations, a particular virtual domain represents a respective set of services and information distinct from those provided by other virtual domains.

In some implementations, the role of a user or a client system 102 determines which virtual domains they are permitted to access.

The security device 104 manages secure communication of the client systems 102 or associated users of the client systems with resources and services provided by the server system 108. The security device both sends and receives data (e.g., data packets including identifiers, counter values, password hashes, etc.) to and from various devices/systems of the server-client environment 100 (e.g., receiving data from/sending data to the client system 102, the server system 108, etc.). In some implementations, the security device 104 moderates incoming and outgoing network traffic (e.g., grants/terminates access by permitting or denying the sending or receiving of data to or from the client systems 102) based on predetermined security protocols (e.g., using cryptographic techniques, such as generating and comparing password hash values; comparing counter values; etc.).

In some implementations, the client system 102 is not communicably connected to the server system 108 through the network 110, and must pass to and/or receive from the server system all data through the security device 104 via channel 112-1 (i.e., the security device 104 acts as a firewall). Once a network connection is established between the client system 102 and the security device 104, and access to network resources and services provided by the server system 108 is granted, channel 112-1 is established and the client system 102 is able to request data or services from the server system 108. In some embodiments, channel 112-1 may be a channel in a network distinct from the network(s) 110, which may be a public communication network (e.g., the Internet and/or a cellular data network), a private communications network (e.g., a private LAN or leased lines), or a combination of such communication networks.

Additionally and/or alternatively, the client system 102 is communicably connected to the server system 108 through network(s) 110 and may receive data via channel 112-2 (i.e., through networks 110) once access to network resources and services provided by the server system 108 is granted (e.g., by security device 104, in accordance with any of the implementations described throughout).

In some implementations, the security device 104 is configured to send and receive packets in accordance with one or more network protocols (e.g., establishing and moderating network connections by sending/receiving SYN, SYN-ACK, ACK, RST, FIN, etc. packets in accordance with TCP/IP). In some implementations, the security device 104 additionally performs any combination of known functions or operations of a typical firewall device, implemented as hardware and/or software components of the security device 104.

The trusted data store 106 facilitates the execution of predetermined security protocols by providing security credentials or data for use in cryptographic processes executed by the security device 104 (or other devices/systems of the client-server environment 100). The trusted data store 106 may be communicably connected to the client system 102, the security device 104, and/or other devices or systems of the client-server environment. In some implementations, the trusted data store 106 provides identifiers, seeds (e.g., randomly generated), counter values (e.g., generated by an internal system counter), and/or other generated credentials for facilitating one or more cryptographic processes. In some implementations, seeds are randomly generated or predefined values (e.g., number, vector, etc.) for use in one or more cryptographic process (e.g., generating a one-time password hash). The trusted data store 106 may include a seed distributor 414 (e.g., for providing identifiers, seeds, counter values, etc. in response to access requests), a seed storage 416 (e.g., table for managing distributed identifier/seed pairs), and/or other components not illustrated (e.g., a system counter for maintaining counter values).

In some implementations, any combination of the security device 104, the trusted data store 106, and/or the server system 108 comprise a single security system to which access requests by the client system 102 are directed. In some implementations, functionality associated with any one of the security device 104, the trusted data store 106, and/or the server system 108 is implemented at a single computing device such as a computer server, or alternatively, is implemented by multiple computing devices working together to perform respective operations and actions (e.g., cloud computing).

Figure 2:
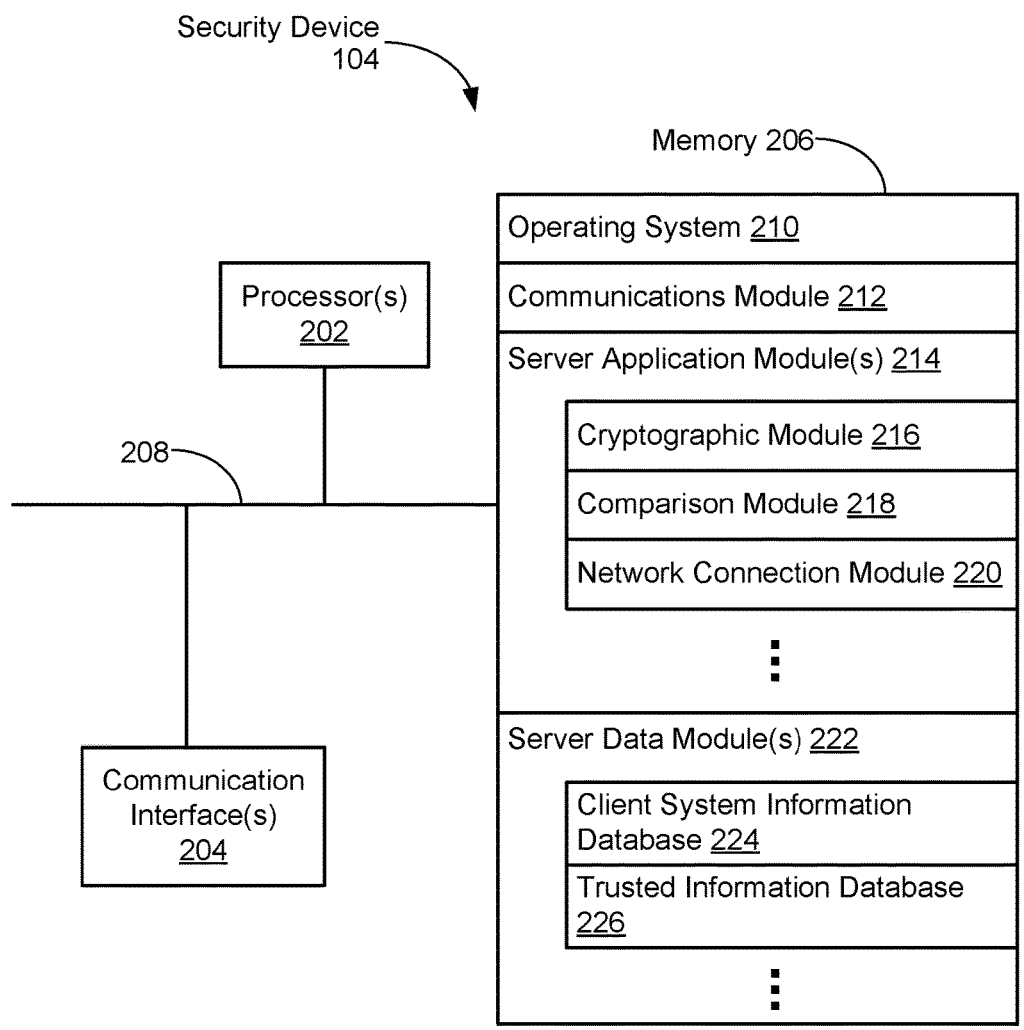
FIG. 2 is a block diagram illustrating an exemplary security device, in accordance with some implementations.

FIG. 2 is a block diagram illustrating an exemplary security device 104, in accordance with some implementations. The security device 104 (a "cryptographic firewall") typically includes one or more processing units (processors or cores) 202, one or more network or other communications interfaces 204, memory 206, and one or more communication buses 208 for interconnecting these components. The communication buses 208 optionally include circuitry (sometimes called a chipset) that interconnects and controls communications between system components. The security device 104 optionally includes a user interface (not shown). The user interface, if provided, may include a display device and optionally includes inputs such as a keyboard, mouse, trackpad, and/or input buttons. Alternatively or in addition, the display device includes a touch-sensitive surface, in which case the display is a touch-sensitive display.

Memory 206 includes high-speed random-access memory, such as DRAM, SRAM, DDR RAM, or other random-access solid-state memory devices; and may include non-volatile memory, such as one or more magnetic disk storage devices, optical disk storage devices, flash memory devices, and/or other non-volatile solid-state storage devices. Memory 206 may optionally include one or more storage devices remotely located from the processor(s) 202. Memory 206, or alternately the non-volatile memory device(s) within memory 206, includes a non-transitory computer-readable storage medium. In some implementations, memory 206 or the computer-readable storage medium of memory 206 stores the following programs, modules and data structures, or a subset or superset thereof:

- an operating system 210 that includes procedures for handling various basic system services and for performing hardware dependent tasks;
- a network communication module 212 that is used for connecting the security device 104 to other computers via the one or more communication network interfaces 204 (wired or wireless) and one or more communication networks (e.g., the one or more networks 110), and for receiving data from and sending data to any connected computers (e.g., any devices/servers/systems connected to the network 110, FIG. 1);
- one or more server application module(s) 214 for enabling the security device 104 to perform the functions offered by the security device 104, including but not limited to:
  - a cryptographic module 216 for generating cryptographic information (e.g., one-time password hashes) using various types of data (e.g., identifiers, counter values, seeds, etc.);
  - a comparison module 218 for comparing data received and/or generated by the security device 104 (e.g., comparing first one-time password hash generated by a client system with a second one-time password hash generated by the security device; comparing a first counter value with a second counter value; etc.);

a network connection module 220 for managing network connections with network connected devices, systems, or servers (e.g., establishing network connection with client systems 102; granting/denying access to network resources provided by a server system 108) in accordance with one or more network protocols (e.g., TCP/IP); and one or more server data module(s) 222 for storing data used in executing one or more security protocols, including but not limited to:

a client system information database 224 including data (e.g., data packets including identifiers, counter values, password hashes, etc.) received from one or more devices or systems requesting access to network resources and services (e.g., client system 102); and a trusted information database 226 including data (e.g., retrieved seeds, current/previous counter values, etc.) received from trusted sources (e.g., trusted data store 106).

The server data module(s) 222 store data in one or more types of databases, such as graph, dimensional, flat, hierarchical, network, object-oriented, relational, and/or XML databases. Data stored in the server data module(s) 222 may include text (e.g., ASCII, SGML, HTML), images (e.g., jpeg, tif and gif), graphics (e.g., vector-based or bitmap), audio, video (e.g., mpeg), other multimedia, and/or combinations thereof.

Figure 3:
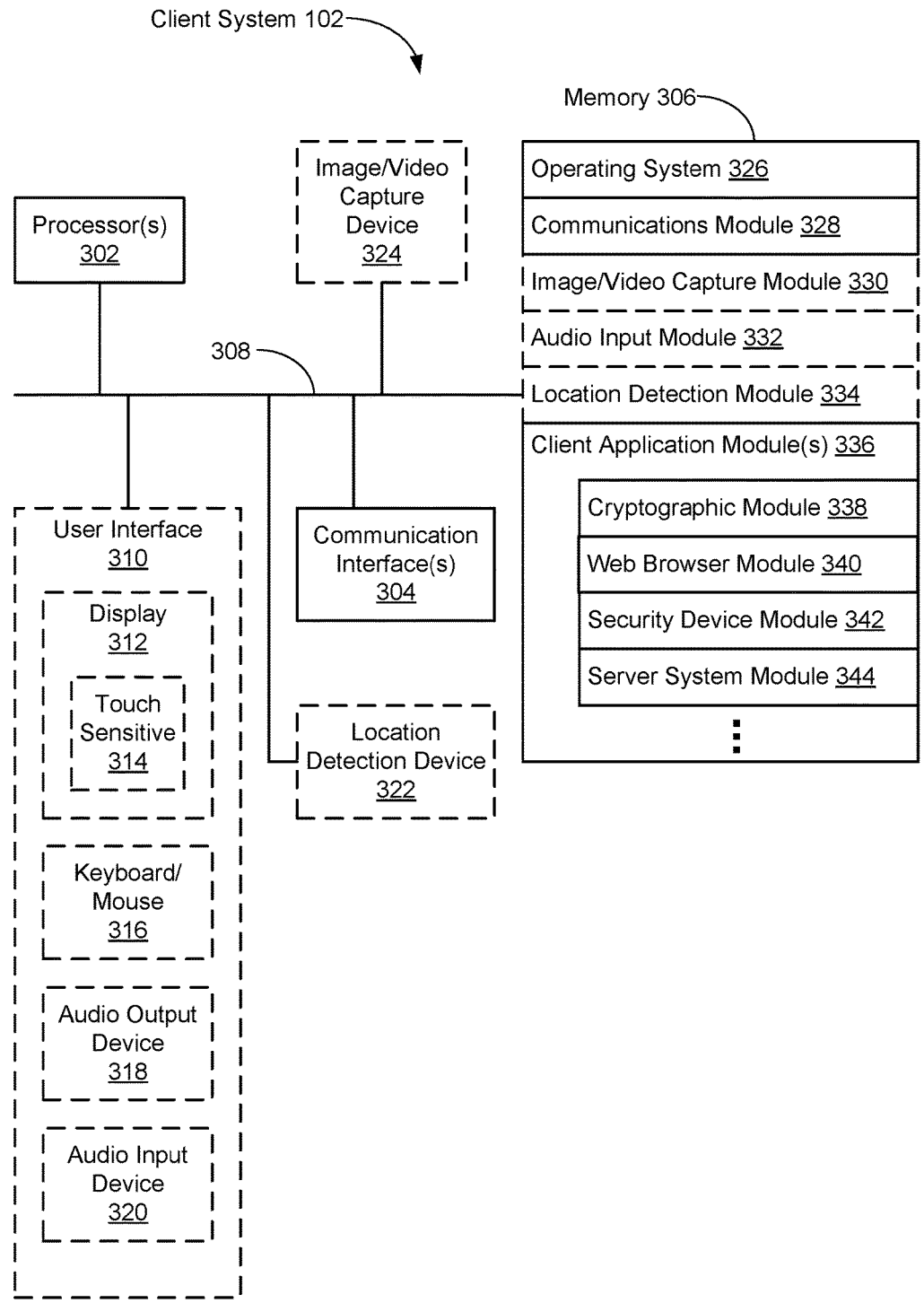
FIG. 3 is a block diagram illustrating an exemplary client system, in accordance with some implementations.

FIG. 3 is a block diagram illustrating an exemplary client system 102, in accordance with some implementations. The client system 102 typically includes one or more processing units (processors or cores) 302, one or more network or other communications interfaces 304, memory 306, and one or more communication buses 308 for interconnecting these components. The communication buses 308 optionally include circuitry (sometimes called a chipset) that interconnects and controls communications between system components.

The client system 102 includes one or more optional components. For example, in some implementations, the client system 102 includes an optional user interface 310. The user interface 310 typically includes a display device 312. In some implementations, the client system 102 includes inputs such as a keyboard, mouse, and/or other input buttons 316. Alternatively or in addition, in some implementations, the display device 312 includes a touch-sensitive surface 314, in which case the display device 312 is a touch-sensitive display. In client systems that have a touch-sensitive display 312, a physical keyboard is optional (e.g., a soft keyboard may be displayed when keyboard entry is needed). The user interface 310 also includes an audio output device 318, such as speakers or an audio output connection connected to speakers, earphones, or headphones. Furthermore, some client systems 102 use a microphone and voice recognition to supplement or replace the keyboard. Optionally, the client system 102 includes an audio input device 320 (e.g., a microphone) to capture audio (e.g., speech from a user). Optionally, the client system 102 includes a location detection device 322, such as a GPS (global positioning satellite) or other geo-location receiver, for determining the location of the client system 102. The client system 102 also optionally includes an image/video capture device 324, such as a camera or webcam.

Memory 306 includes high-speed random-access memory, such as DRAM, SRAM, DDR RAM or other random-access solid-state memory devices; and may include non-volatile memory, such as one or more magnetic disk storage devices, optical disk storage devices, flash memory devices, or other non-volatile solid-state storage devices. Memory 306 may optionally include one or more storage devices remotely located from the processor(s) 302. Memory 306, or alternately the non-volatile memory device(s) within memory 306, includes a non-transitory computer-readable storage medium. In some implementations, memory 306 or the computer-readable storage medium of memory 306 stores the following programs, modules and data structures, or a subset or superset thereof:

an operating system 326 that includes procedures for handling various basic system services and for performing hardware dependent tasks;

a network communication module 328 that is used for connecting the client system 102 to other computers via the one or more communication network interfaces 304 (wired or wireless) and one or more communication networks, such as the Internet, cellular telephone networks, mobile data networks, other wide area networks, local area networks, metropolitan area networks, and so on), and for receiving data from and sending data to any connected computers (e.g., any devices/servers/systems connected to the network 110, FIG. 1);

an optional image/video capture module 330 (e.g., a camera module) for processing a respective image or video captured by the image/video capture device 324, where the respective image or video may be sent or streamed (e.g., by a client application module 336) to the social-network system 108;

an optional audio input module 332 (e.g., a microphone module) for processing audio captured by the audio input device 320, where the respective audio may be sent or streamed (e.g., by a client application module 336) to the social-network system 108;

an optional location detection module 334 (e.g., a GPS, Wi-Fi, or hybrid positioning module) for determining the location of the client system 102 (e.g., using the location detection device 322) and providing this location information for use in various applications; and one or more client application modules 336 for enabling the client system 102 to perform the functions offered by the client system 102, including but not limited to:

a cryptographic module 338 for generating cryptographic information (e.g., one-time password hashes) using various types of data (e.g., identifiers, counter values, seeds, etc.);

an optional web browser module 340 (e.g., Internet Explorer by Microsoft, Firefox by Mozilla, Safari by Apple, or Chrome by Google) for accessing, viewing, and interacting with web sites (e.g., a web site provided the server system 108);

a security device module 342 for interfacing with one or more security systems (e.g., establishing TCP connection with, and sending data packets to, a security device 104; obtaining identifier/seed pairs from a trusted data store 106; etc.) in order to obtain access to resources, data, applications, services, and/or related features provided by a network connected device or system (e.g., server system 108); and/or a server system module 344 for providing an interface to resources, data, applications, services, and/or related features provided by a network connected device or system (e.g., server system 108).

In some implementations, the client system 102 includes none (or only some) of the optional components or modules described above. The client system 102 may, for example, be any intelligent, multi-sensing, network-connected device without a user interface (e.g., smart lightbulb, smoke detector, etc.).

Figure 4:
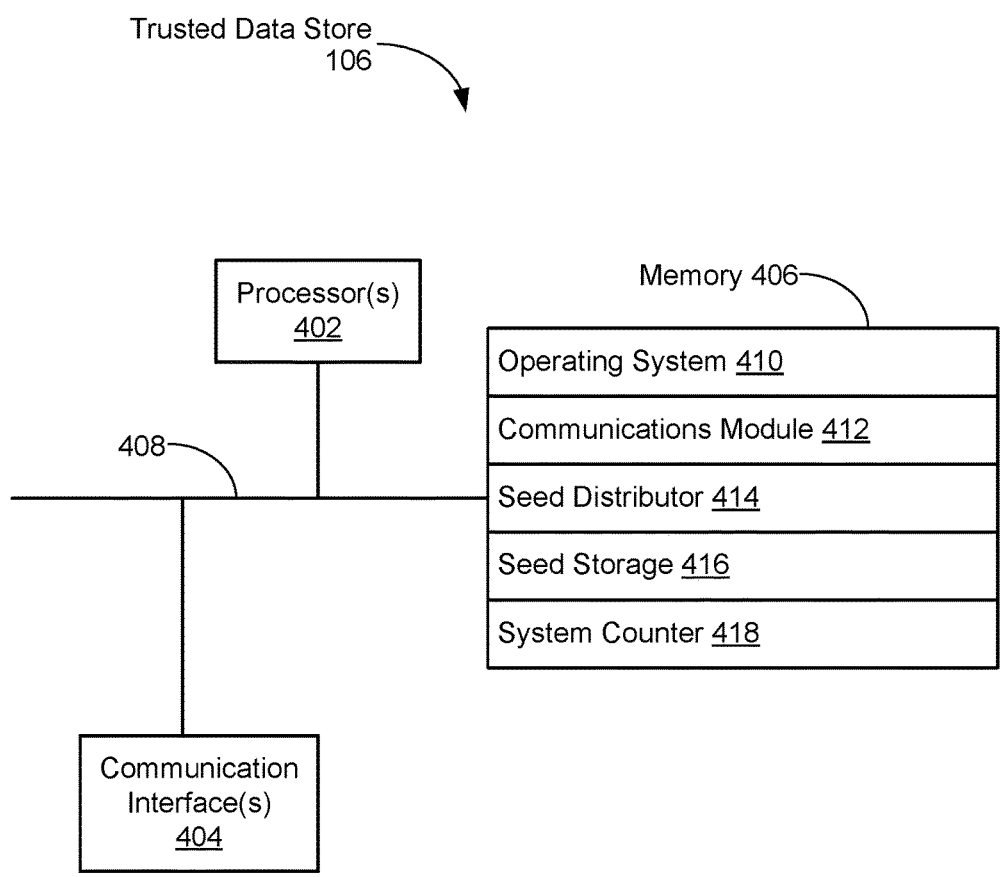
FIG. 4 is a block diagram illustrating an exemplary trusted data store, in accordance with some implementations.

FIG. 4 is a block diagram illustrating an exemplary trusted data store 106, in accordance with some implementations. The trusted data store 106 typically includes one or more processing units (processors or cores) 402, one or more network or other communications interfaces 404, memory 406, and one or more communication buses 408 for interconnecting these components. The communication buses 408 optionally include circuitry (sometimes called a chipset) that interconnects and controls communications between system components. The trusted data store 106 optionally includes a user interface (not shown). The user interface, if provided, may include a display device and optionally includes inputs such as a keyboard, mouse, trackpad, and/or input buttons. Alternatively or in addition, the display device includes a touch-sensitive surface, in which case the display is a touch-sensitive display.

Memory 406 includes high-speed random-access memory, such as DRAM, SRAM, DDR RAM, or other random-access solid-state memory devices; and may include non-volatile memory, such as one or more magnetic disk storage devices, optical disk storage devices, flash memory devices, and/or other non-volatile solid-state storage devices. Memory 406 may optionally include one or more storage devices remotely located from the processor(s) 402. Memory 406, or alternately the non-volatile memory device(s) within memory 406, includes a non-transitory computer-readable storage medium. In some implementations, memory 406 or the computer-readable storage medium of memory 406 stores the following programs, modules and data structures, or a subset or superset thereof:

- an operating system 410 that includes procedures for handling various basic system services and for performing hardware dependent tasks;
- a network communication module 412 that is used for connecting the trusted data store 106 to other computers via the one or more communication network interfaces 404 (wired or wireless) and one or more communication networks (e.g., the one or more networks 110), and for receiving data from and sending data to any connected computers (e.g., any devices/servers/systems connected to the network 110, FIG. 1);
- a seed distributor 414 for distributing data to devices and systems in relation to requests for access (e.g., providing identifiers, seeds, counter values, etc. to a client system 102 in response to a request for access to network resources and services; providing a corresponding seed and a previous counter value to a security device 104 in response to receiving an identifier; etc.);
- a seed storage 416 storing data used in executing one or more security protocols (e.g., identifier/seed pairs, counter values, generated password hashes, etc.); and/or
- a system counter 418 for maintaining, generating, and storing incremental counts (e.g., in response to access requests received by client systems 102).

Each of the above identified modules and applications correspond to a set of executable instructions for performing one or more functions as described above and/or in the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various implementations. In some implementations, memory 206, 306, and/or 406 store a subset of the modules and data structures identified above. Furthermore, memory 206, 306, and/or 406 optionally store additional modules and data structures not described above.

In some implementations, the functions of any of the devices and systems described herein (e.g., client system 102, security device 104, trusted data store 106, server system 108, etc.) are interchangeable with one another and may be performed by any other devices or systems, where the corresponding sub-modules of these functions may additionally and/or alternatively be located within and executed by any of the devices and systems. As an example, although the memory 306 of the client system 102 includes a cryptographic module 338 for generating cryptographic information, the trusted data store 106 may include the same or a similar module for performing the same or similar functions. The devices and systems shown in and described with respect to FIGS. 1-4 are merely illustrative, and different configurations of the modules for implementing the functions described herein are possible in various implementations.

Figure 5:
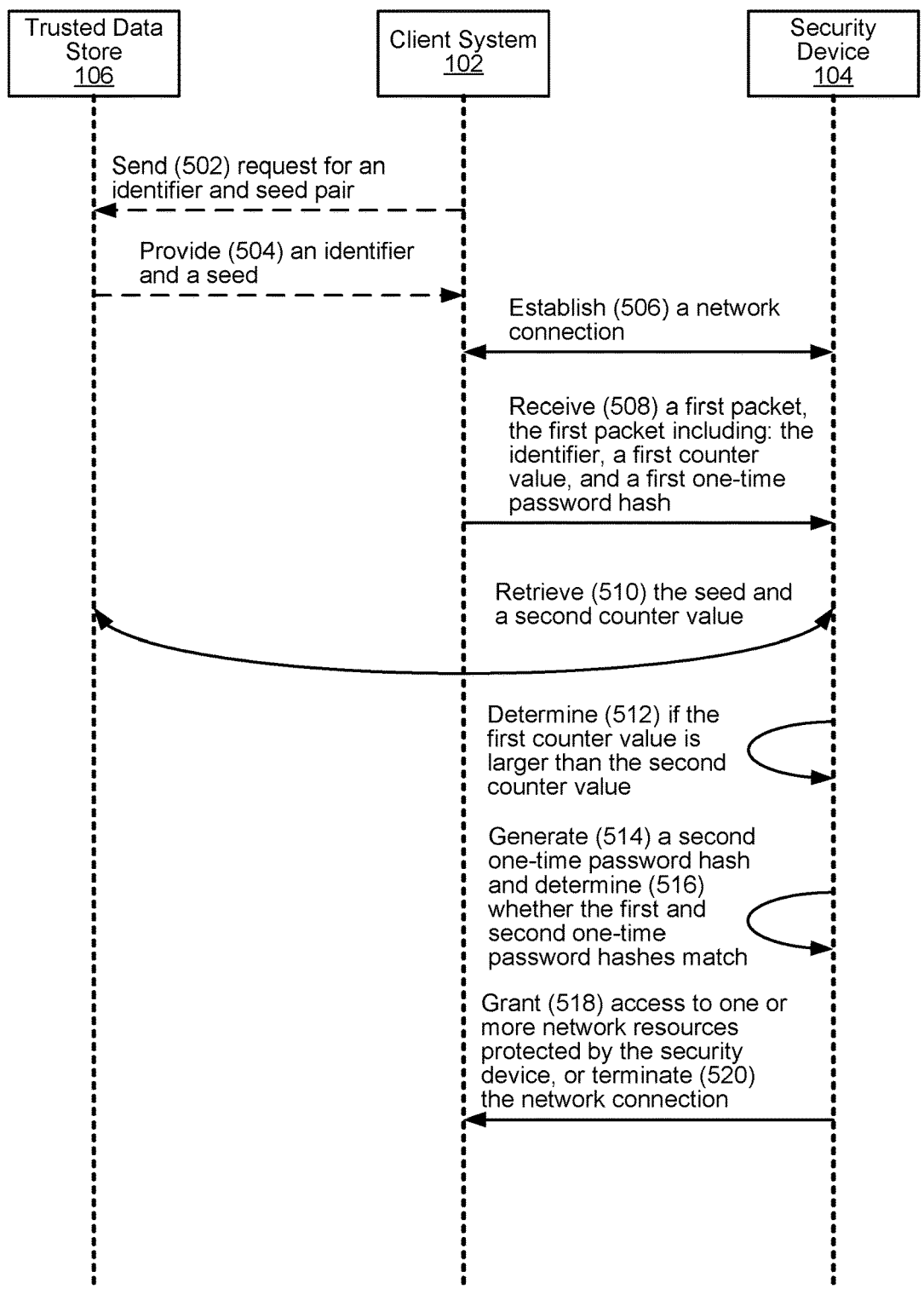
FIG. 5 is a flow diagram illustrating a method for using cryptographic techniques in securing access to protected network resources, in accordance with some implementations.

FIG. 5 is a flow diagram illustrating a method 500 for using cryptographic techniques in securing access to protected network resources, in accordance with some implementations. In some implementations, the method 500 is performed by one or more devices or systems (e.g., client system 102, security device 104, trusted data store 106, etc., FIGS. 1-4), or any combination thereof. FIG. 5 corresponds to instructions stored in a computer memory (e.g., memory 206 of the security device 104, FIG. 2; memory 306 of the client system 102, FIG. 3; memory 406 of the trusted data store 106, FIG. 4) or other computer-readable storage medium.

As an overview of the method 500, a security device (e.g., security device 104, FIGS. 1 and 2) establishes (506) a network connection with a client system (e.g., client system 102, FIGS. 1 and 3). After establishing the network connection, the security device receives (508) from the client system a first packet. The first packet includes an identifier, a first counter value (e.g., generated by the client system, received from the trusted data store, etc.), and a first one-time password hash generated by the client system based on the identifier, the first counter value, and a seed. Based on the identifier received from the client system, the security device retrieves (510) from a trusted data store the seed and a second counter value. If the first counter value is larger than the second counter value, the security device generates (514) a second one-time password hash based on the identifier, the first counter value, and the seed. The security device then determines (516) whether the first one-time password hash and the second one-time password hash match. In accordance with a determination that the first one-time password hash and the second one-time password hash match, the security device grants (518), to the client system via the network connection, access to one or more network resources protected by the security device. In some implementations, the method 500 is performed in response to a request by the client system to access network resources (e.g., provided by the server system 108, FIG. 1) protected by the security device. In some implementations, one or more steps of the method 500 are performed automatically without requiring additional user interaction. For example, in some implementations, after the client system obtains an identifier/seed pair from the trusted data store (e.g., after submitting valid security credentials to the trusted data store with the request), the steps 506 to 520 of the method (and any implementations thereof) are performed automatically (e.g., as a background process during the execution of a security protocol) without any additional input by an associated user of the client system. Various implementations of the method 500 are described in greater detail below.

In some implementations, prior to the security device (e.g., security device 104) establishing (step 506) the network connection with the client system (e.g., client system 102), the client system sends (502) to a trusted data store (e.g., trusted data store 106) (and the trusted data store receives from the client system) a request for an identifier and seed pair (e.g., as, or included with, a request for access to network resources and services provided by a server system 108). In response to the request, the trusted data store provides to the client system (and the client system receives from the trusted data store) an identifier and a seed.

Identifiers may identify a user session (i.e., a session in which access to network resources or services is requested) and/or a client system requesting initiation of the user session. For example, in some implementations, the identifier is data uniquely identifying a user session associated with the client system's request for the identifier and seed pair (e.g., timestamp in combination with a username, system ID, etc.). In some implementations, the identifier is a random number that is used for only one user session. In some implementations, the identifier is a name or password associated with an associated user that has been encrypted (e.g., username/password submitted for retrieving the identifier/seed pair). The encryption may be performed using a key that is stored at the trusted data store.

Seeds may be randomly generated or predefined values (e.g., number, vector, etc.) for use in a cryptographic process (e.g., generating a one-time password hash), as described in greater detail below. In some implementations, the trusted data store manages a plurality of identifier and seed pairs (e.g., stored in seed storage 416 of the trusted data store 106, FIG. 4), where each respective pair corresponds to a respective identifier that is uniquely associated with the respective seed. In other words, in some implementations, a given identifier corresponds only to a single seed, and vice versa.

In some implementations, in response to receiving the request for the identifier and seed pair, and in addition to providing the identifier and seed, the trusted data store also provides to the client system a first counter value. The first counter value is one of a plurality of incremental counts generated by a system counter. In some implementations, the system counter is a component of the trusted data store (e.g., system counter 418, FIG. 4), while in other implementations, the system counter is a component of a remote device associated with, but distinct from, the trusted data store. In some implementations, the system counter monotonically increases for each access request received from the client system (e.g., sequentially, by a predefined value, etc.). As an example, if a counter value prior to receiving the access request is "0," the system counter increments the count from "0" to "1" (the first counter value) after the trusted data store 106 receives the request from the client system 102. The first counter value "1" is then provided to the client system.

Alternatively, the client system itself generates the first counter value in response to receiving the identifier and seed from the trusted data store. In some implementations, a system counter of the client system (rather than the trusted data store or other device) is incremented such that the first counter value is greater than a previous counter value that was generated for a previous request.

In some implementations, the identifier, the seed, and/or the first counter value are provided to the client system by the trusted data store in response to authenticating the client system. As an example, the trusted data store provides the identifier/seed/first counter value to the client system only after valid user credentials are provided by the client system (e.g., username/password that are verified against a trusted user database stored at the trusted data store, USB token, RSA token number, or any other secure identification method). Other methods of authenticating the client system include verifying information identifying the client system (e.g., IP address, MAC address, geographical location, etc. of the client system 102).

In some implementations, after receiving the identifier, the first counter value, and the seed, the client system generates a first one-time password hash based on the identifier, the first counter value, and the seed. Cryptographic processes may employ a variety of cryptographic hash algorithms/functions (e.g., MD4, MD5, SHA-1, SHA-2, HMAC, GMAC, etc.) to generate hash values of different sizes (e.g., digests of varying sizes, such as 128-bit, 160-bit, etc.). In some implementations, data input to the hash algorithms may include any combination of data stored in the client system and/or retrieved from the trusted data store, including but not limited to the identifier, the first counter value, the seed, and/or other additional variables for generating the hash.

The client system and the security device establish (506) a network connection. In some implementations, the network connection is established over one or more networks (e.g., networks 110) based on wireless communications protocols (e.g., IEEE 802.11, cellular network, etc.) or wired communications protocols (e.g., Ethernet). In some implementations, the network connection is a Transmission Control Protocol (TCP) connection. Here, establishing the network connection with the client system prior to receiving a first packet from the client system (step 508) includes the security device receiving from the client system (and the client system sending to the security device) a SYN packet. In response to the security device receiving (or the client system sending) the SYN packet, the security device sends to the client system (and the client system receives from the security device) a SYN-ACK packet. After the security device sending (or the client system receiving) the SYN-ACK packet, the security device receives from the client system (and the client system sends to the security device) an ACK packet, thereby establishing the network connection and permitting the receipt of data from the client system (e.g., the first packet).

After establishing the network connection, the security device receives (508) from the client system (and the client system sends to the security device) a first packet. The first packet includes the identifier (received by the client system at 504), a first counter value (received or alternatively generated by the client system at 504), and a first one-time password hash (e.g., generated by the client system/trusted data store). In some implementations, receiving the first packet includes receiving the first packet embedded in a body of an HTTP POST. In some implementations, receiving the first packet includes receiving the first packet embedded within an HTTP GET URL. In some implementations, receiving the first packet includes receiving the first packet in a TLS Client Hello message, wherein the first packet is placed within the "random" field of the TLS Client Hello message.

Based on the identifier received from the client system, the security device retrieves (510) from the trusted data store (and the trusted data store provides to the security device) the seed and a second counter value. That is, the security device sends, to the trust data store, the identifier received from the client system, and in return, the security device receives a corresponding seed and a second counter value. Although the security device and the client system may individually retrieve the seed from the trusted data store, the security device and the client system never exchange the seed directly between each other, thus ensuring that the seeds being used have not been compromised. In some implementations, the second counter value is a previous counter value maintained by the trusted data store (e.g., a previous count which reflects the system counter before the trusted data store provided the first counter value to the client system). The seed retrieved using the identifier provided by the client system, as well as the second counter value, provide security mechanisms for verifying the authenticity of the client system requesting access to the protected network resources. As described in greater detail below, in some implementations, granting access to protected network resources requires the satisfaction of at least two security conditions, namely that: (1) the hash generated by the security device based on the seed retrieved from the trusted data store matches the hash received from the client system (which is generated using the seed received from the trusted data store by the client system), and (2) the previous counter value obtained from the trusted data store (i.e., the second counter value) is less than the counter value provided by the client system (i.e., the first counter value). Therefore, in some implementations, unless valid security credentials were somehow illegitimately obtained, unauthorized users seeking to access protected network resources would need to successfully satisfy both conditions with respect to data contained within the first packet (provided to the security device at step 508).

After retrieving the seed and the second counter value, the security device determines (512) if the first counter value is larger than the second counter value. If the first counter value is less than or equal to the second counter value, the security device terminates (e.g., sends a reset packet to the client system) the network connection with the client system (various implementations for terminating the network connection are described in greater detail below). However, if the first counter value is larger than the second counter value, the security device generates (514) a second one-time password hash based on the identifier (received from the client system), the first counter value (received from the client system), and the seed (retrieved from the trusted data store). Comparing the first and second counter values provides a preliminary security mechanism for determining the authenticity of the client system.

Time values (e.g., date, time of day, etc.) may be used additionally and/or alternatively to counter values. For example, in some implementations, for a given access request, the client system sends the security device a first time value and also generates a first one-time password hash based on the first time value (step 508). The security device then compares (step 512) the first time value with a current time value (e.g., a current time maintained by a system clock of the security device, trusted data store, etc.). If the first time value falls within a predefined range of the current time value (e.g., within 1 minute), the security device generates (step 514) a second one-time password hash based on the identifier (received from the client system), the first time value (received from the client system), and the seed (retrieved from the trusted data store). However, if the first time value does not fall within the predefined range of the current time value, the security device terminates (e.g., sends a reset packet to the client system) the network connection with the client system.

After generating the second one-time password hash (e.g., generated if first counter value is larger than the second counter value), the security device determines whether the first one-time password hash and the second one-time password hash match. In accordance with a determination that the first one-time password hash and the second one-time password hash match, the security device grants (518), to the client system, access to one or more network resources protected by the security device via the network connection. That is, if the first and second one-time password hashes match, the security device maintains the network connection (e.g., TCP) and permits the exchange of data between the client system and a device/server system that provides the requested network sources (e.g., the security device 104 receives data from the client system 102, and passes the data to the server system 108, FIG. 1). In some implementations, the system counter (e.g., system counter 418, FIG. 4) is updated (e.g., incremented to match the first counter value) in accordance with a determination that the first one-time password hash and the second one-time password hash match.

In some embodiments, rather than retrieving the second counter value from the trusted data store (step 510), the security device identifies the second counter value based on a system counter that the security device itself maintains. The system counter of the security device may be updated (e.g., incremented to match the first counter value) each time it receives a packet from a client system (step 508). Alternatively, the system counter of the security device may be updated (e.g., incremented to match the first counter value) in accordance with a determination that the first one-time password hash and the second one-time password hash match.

In some implementations, in accordance with a determination that the first one-time password hash and the second one-time password hash do not match, the security device terminates (520) the network connection with the client system. In some implementations, the first and second one-time password hashes fail to match as a result of different seeds used in generating the first one-time password hash and in generating the second one-time password hash. This may occur, for example, if the client system (e.g., suspected of attempting unauthorized access) provides in the first packet a valid identifier, but an invalid corresponding seed.

In addition to terminating the network connection if the first and second one-time password hashes do not match, as described previously, the network connection may also be terminated if the first counter value is less than or equal to the second counter value (determined at step 512). In any case, the network connection (e.g., TCP connection) may be terminated using a variety of techniques. For example, in some implementations, terminating the network connection with the client system includes the security device sending a reset packet (e.g., RST packet) to the client system (or alternatively, the client system sends a RST packet to the security device). Accordingly, all further communications from the client system (or the security device) are ignored. In some implementations, the security device sends to the client system (and the client system receives from the security device) a FIN packet. In return, the client system sends to the security device (and the security device receives from the client system) a FIN-ACK packet. Finally, the security device sends to the client system (and the client system receives from the security device) an ACK packet, thereby terminating the network connection. In some implementations, terminating the network connection with the client system includes foregoing acknowledgment of packets received from the client system that are associated with the user session or the established network connection (e.g., no additional information or packets are sent by the security device to the client system). In some implementations, terminating the network connection with the client system further includes clearing table entries associated with the connection request (e.g., entries stored in the memory 206 of the security device 104, FIG. 2).

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method for accessing network resources protected by a security device, comprising:
   at a security device having one or more processors and memory storing one or more programs for execution by the one or more processors:
   establishing a network connection with a client system;
   after establishing the network connection, receiving from the client system a first packet, the first packet including:
   an identifier,
   a first counter value, wherein the first counter value is one of a plurality of incremental counts generated by a system counter, and
   a first one-time password hash generated by the client system based on the identifier, the first counter value, and a seed;
   based on the identifier received from the client system, retrieving from a trusted data store the seed and a second counter value,
   wherein the identifier and the seed are provided to the client system by the trusted data store based on authenticating the client system;
   based on the first counter value being larger than the second counter value:
   generating a second one-time password hash based on the identifier, the first counter value, and the seed;
   determining whether the first one-time password hash and the second one-time password hash match; and
   in accordance with a determination that the first one-time password hash and the second one-time password hash match, granting, to the client system, access to one or more network resources protected by the security device via the network connection.

2. The method of claim 1, wherein the identifier and the seed are provided to the client system by the trusted data store based on a request for an identifier and seed pair, and prior to the security device establishing the network connection with the client system.

3. The method of claim 1, wherein the network connection is a TCP connection.

4. The method of claim 1, wherein the trusted data store includes the system counter, and wherein the system counter monotonically increases for each request received from the client system.

5. The method of claim 1, wherein the system counter is updated in accordance with a determination that the first one-time password hash and the second one-time password hash match.

6. The method of claim 1, further comprising terminating the network connection with the client system, based on the first counter value being less than or equal to the second counter value.

7. The method of claim 1, further comprising terminating the network connection with the client system in accordance with a determination that the first one-time password hash and the second one-time password hash do not match.

8. The method of claim 7, wherein terminating the network connection with the client system comprises sending a reset packet to the client system.

9. The method of claim 7, wherein terminating the network connection with the client system comprises foregoing acknowledgment of packets received from the client system.

10. The method of claim 7, wherein terminating the network connection with the client system further comprises clearing table entries associated with a connection request.

11. The method of claim 1, wherein receiving the first packet comprises receiving the first packet embedded in a body of an HTTP POST.

12. The method of claim 1, wherein receiving the first packet comprises receiving the first packet embedded within an HTTP GET URL.

13. The method of claim 1, wherein receiving the first packet comprises receiving the first packet in a TLS Client Hello message, wherein the first packet is placed within a random field of the TLS Client Hello message.

14. The method of claim 1, wherein establishing the network connection with the client system comprises:
   prior to receiving the first packet from the client system:
   receiving a SYN packet from the client system;
   based on receiving the SYN packet, sending a SYN-ACK packet to the client system; and
   after sending the SYN-ACK packet, receiving, from the client system, an ACK packet, thereby establishing the network connection and permitting receipt of the first packet from the client system.

15. A security device, comprising:
   one or more processors; and
   memory storing one or more programs for execution by the one or more processors, the one or more programs including instructions for:

establishing a network connection with a client system;
after establishing the network connection, receiving from the client system a first packet, the first packet including:
an identifier,
a first counter value, wherein the first counter value is one of a plurality of incremental counts generated by a system counter, and
a first one-time password hash generated by the client system based on the identifier, the first counter value, and a seed;
based on the identifier received from the client system, retrieving from a trusted data store the seed and a second counter value,
wherein the identifier and the seed are provided to the client system by the trusted data store based on authenticating the client system;
based on the first counter value being larger than the second counter value:
generating a second one-time password hash based on the identifier, the first counter value, and the seed;
determining whether the first one-time password hash and the second one-time password hash match; and
in accordance with a determination that the first one-time password hash and the second one-time password hash match, granting, to the client system, access to one or more network resources protected by the security device via the network connection.

16. The security device of claim 15, wherein the identifier and the seed are provided to the client system by the trusted data store based on a request for an identifier and seed pair, and prior to the security device establishing the network connection with the client system.

17. The security device of claim 15, wherein the network connection is a TCP connection.

18. The security device of claim 15, wherein the trusted data store includes the system counter, and wherein the system counter monotonically increases for each request received from the client system.

19. The security device of claim 15, wherein the system counter is updated in accordance with a determination that the first one-time password hash and the second one-time password hash match.

20. A non-transitory computer readable storage medium, storing one or more programs for execution by one or more processors, the one or more programs including instructions for:
establishing a network connection with a client system;
after establishing the network connection, receiving from the client system a first packet, the first packet including:
an identifier,
a first counter value, wherein the first counter value is one of a plurality of incremental counts generated by a system counter, and
a first one-time password hash generated by the client system based on the identifier, the first counter value, and a seed;
based on the identifier received from the client system, retrieving from a trusted data store the seed and a second counter value,
wherein the identifier and the seed are provided to the client system by the trusted data store based on authenticating the client system;
based on the first counter value being larger than the second counter value:
generating a second one-time password hash based on the identifier, the first counter value, and the seed;
determining whether the first one-time password hash and the second one-time password hash match; and
in accordance with a determination that the first one-time password hash and the second one-time password hash match, granting, to the client system, access to one or more network resources via the network connection.

* * * * *